Nov. 8, 1938.                G. F. STEWART                2,135,736
                    HOSE HANDLING AND STORING APPARATUS
                 Filed Jan. 7, 1938          3 Sheets-Sheet 1
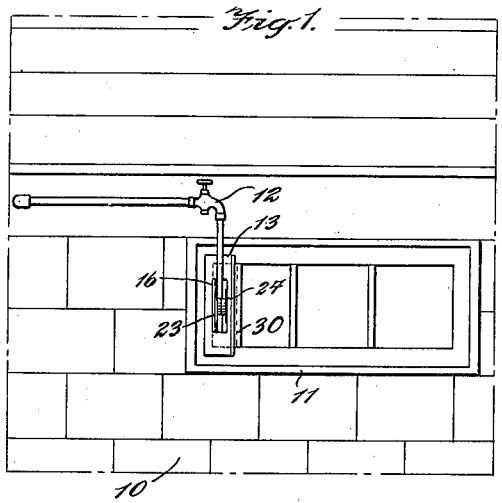
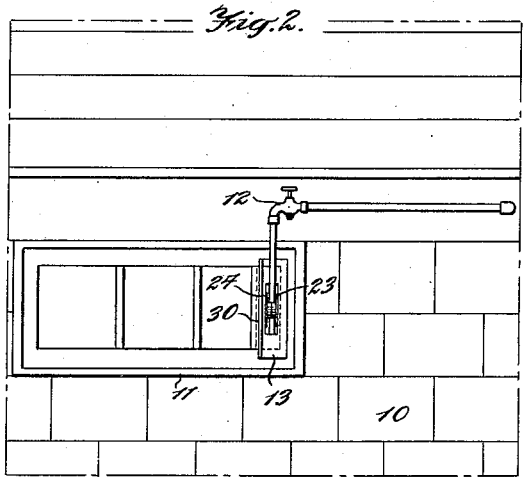
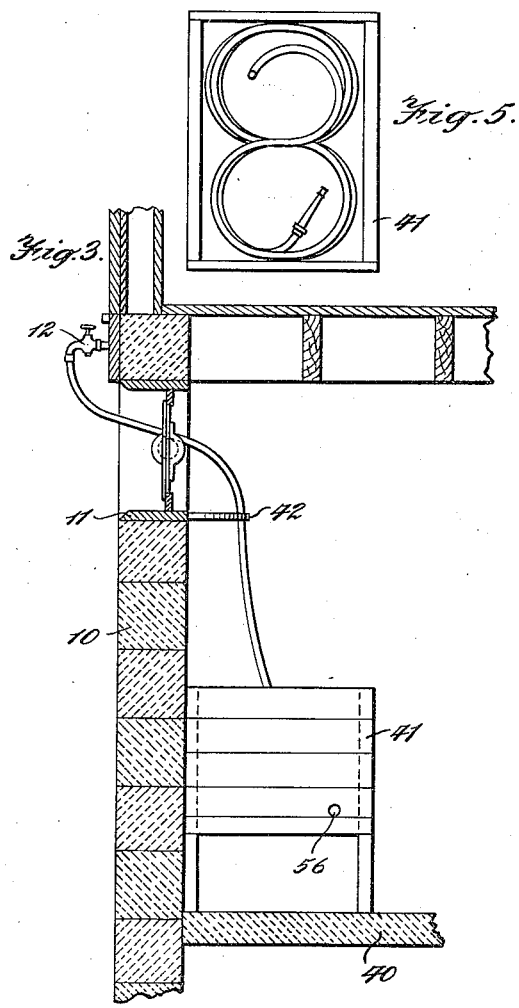
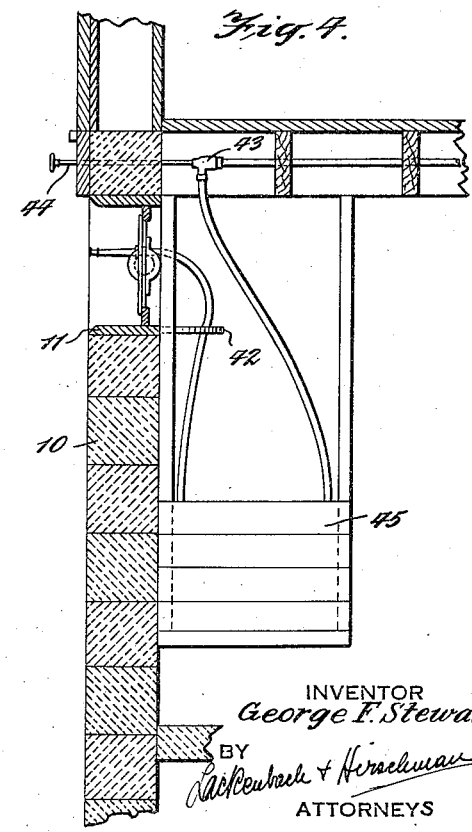
INVENTOR
George F. Stewart
BY
Lackenbach & Hirschman
ATTORNEYS Nov. 8, 1938.　　　　G. F. STEWART　　　　2,135,736
HOSE HANDLING AND STORING APPARATUS
Filed Jan. 7, 1938　　　3 Sheets-Sheet 2
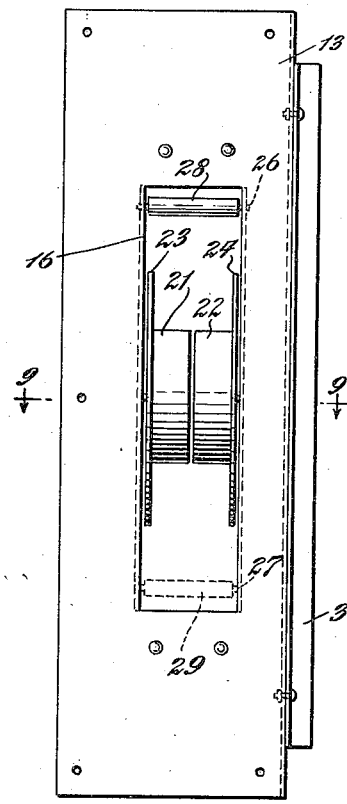
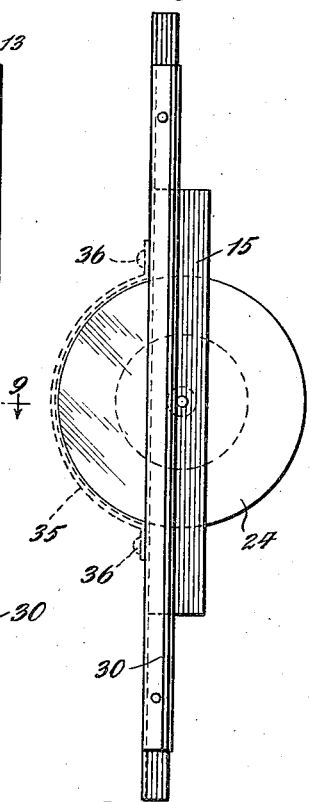
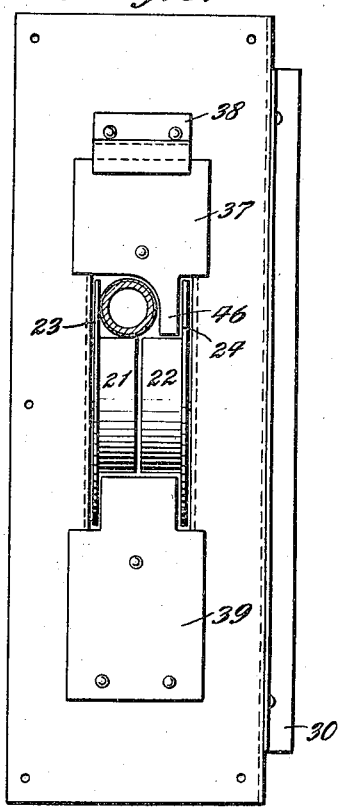
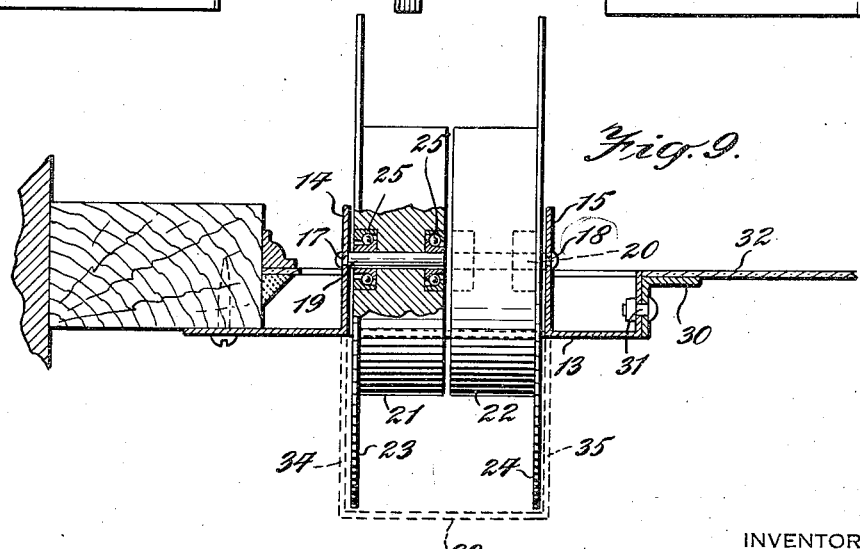
INVENTOR
George F. Stewart
BY
Lackenbach & Hirschman
ATTORNEYS

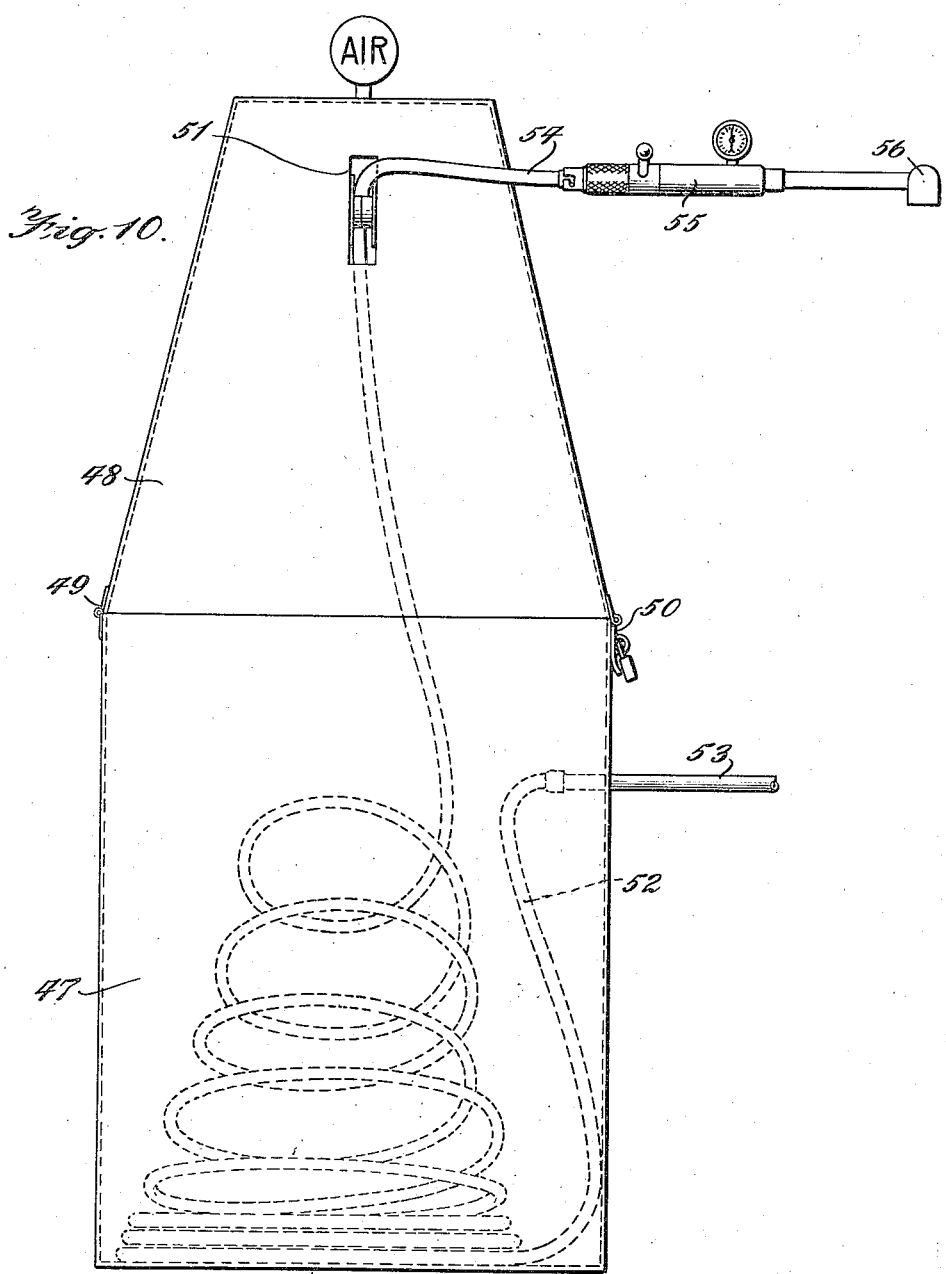

Patented Nov. 8, 1938

2,135,736

UNITED STATES PATENT OFFICE 2,135,736

HOSE HANDLING AND STORING APPARATUS

George F. Stewart, Scotia, N. Y.

Application January 7, 1938, Serial No. 183,743

10 Claims. (Cl. 242—86)

The invention relates to a guide or roller constituting a conveyor mechanism for a length of hose, such as a garden watering hose or an air hose used at automobile service stations for supplying air under pressure for inflating automobile tires, and to a container for receiving, by gravity, the length of hose passed over the guide, and serving for storing such hose during periods of non-use. The conveyor mechanism is such as makes available, for dispensing, any desired length of hose from the storage container.

More particularly, the invention relates to a mechanism constituting a guide or roller whereby the length of hose may be passed from the area in which it is used, for instance, in the application of the invention to the storage of a garden hose, from an area immediately in front of a window or other opening to a cellar, to a container within the confines of the cellar walls, the container being disposed immediately below the conveyor mechanism so that the coils of hose may be guided by such mechanism to a position immediately above the storage container and to be deposited in coils or convolutions in such storage container by gravity.

The primary object of the invention is to provide such a hose roller and storage apparatus which is inexpensive to manufacture, may be applied with facility to existing building structures, and is operative to effect the desired result with facility and dispatch without any particular attention or skill necessarily applied to it by the operator. A more particular object of the invention is to provide an apparatus by means of which a length of hose may be easily disposed and stored, after use, in a container in which it is protected from the deteriorative effects of sunlight, heat and changing weather conditions. In accordance with the particular embodiment of the invention illustrated, as applied to the storage of a garden hose, the hose, after use, is adapted by my apparatus to be conducted to its storage container disposed within the reasonably dark, cool and damp confines of a cellar so that it is at all times ready to be easily withdrawn when desired. In this manner, the ordinary life of the garden hose is substantially doubled, not only because it is guarded from the effects of climatic deterioration, but by reason of the use of my novel guiding or conveyor apparatus therefor, including the use of a pair of differential ball bearing rollers for the conveyor or guiding structure, the hose remains, after substantially innumerable and frequent handling thereof, and by reason of its storage in a substantially closed container, practically new.

My novel apparatus is characterized by a simplicity of construction and capacity for handling by the most unskilled operator, as it is practically automatic in operation. It is also substantially incapable of getting out of order and has no deteriorating effect upon the material of the hose so that repeated use of the apparatus does not, to any substantial extent, have any destructive effect upon the hose.

In its broadest aspect, my novel structure of hose guide or conveyor and storage container is constituted of a mechanism for guiding the length of hose through an opening, for instance, in the window in the cellar, by means of a pair of ball bearing, grooved rollers, the coils of hose after passage over such rollers, being gathered within a storage container positioned immediately below and to the rear of the guiding or conveying mechanism.

A particular embodiment of my invention, showing its application to the conveying and storage of a garden hose in the basement of a building structure, is illustrated in the accompanying drawings, in which Fig. 1 is a front elevation of the wall of the building structure and the window opening to the cellar or basement thereof, to which window opening there has been applied my novel guide or conveying mechanism; Fig. 2 is a view similar to Fig. 1 but showing the hose guide or conveying mechanism applied at the opposite end of the window; Fig. 3 is a vertical section through the basement wall and window showing the disposition of my novel conveyor mechanism and storage container for the hose; Fig. 4 is a vertical section, similar to Fig. 3, showing a slightly modified supporting structure for the storage container and a modified form of hose connection; Fig. 5 is a plan view of the length of hose within the storage container showing its disposition therein and the configuration of the coils of hose naturally assumed as the hose drops by gravity into the container; Fig. 6 is a front elevation of the retainer plate and hose guide mechanism supported thereby; Fig. 7 is a side view of the mechanism shown on Fig. 6; Fig. 8 is a view similar to Fig. 6 showing two conveyor plates for the hose opening within the retainer plate; Fig. 9 is an enlarged sectional view along the line 9—9 of Fig. 6; and Fig. 10 is a front elevation of an automobile tire air supply standard embodying my hose roller and storage container structure.

Referring more particularly to the drawings, in which similar reference characters identify similar parts in the several views, 10 designates the building wall constituting the wall of the basement or cellar in which wall is the usual opening for a window sash 11. A portion of the glass constituting one panel of the window nearest the water faucet 12 extending from the wall of the building, is cut out so as to have disposed in the space left by the glass removed therefrom, a retainer plate 13 of sheet iron. Such retainer plate, as shown in Figs. 6 and 7, has a vertical slot cut substantially in the center thereof, the material at each side of the slot being turned backwardly out of the plane of the retainer plate so as to constitute rearwardly extending flanges 14 and 15, with a wide, elongated opening 16 being thus formed in the retainer plate. The flanges 14 and 15 are provided in the centers thereof longitudinally with apertures 17 and 18, through which pass respectively shafts 19 and 20 of a pair of rollers 21 and 22. The rollers at each side contiguous to the sides of the elongated opening 16, are provided with flanges 23 and 24.

The rollers 21 and 22 are each provided with ball bearings 25 and are adapted by the nature of their supporting structure, as hereinabove described, to act entirely independently of each other in the manner of the rear wheels of an automobile, so that the hose passing over such rollers, may be pulled sidewise rather than straight forwardly, an advantage in use.

Disposed upon shafts 26 and 27 near the upper and lower extremities of the elongated opening 16 are rollers 28 and 29, respectively, which are effective to prevent friction of the hose against the upper edge of the slot if the hose should be pulled upwardly from the rollers 21 and 22, or either of them, for instance, when the operator stands too close to the basement window. The lower roller 29 is provided to effect the same purpose in the instance in which the retainer plate is used at the opposite end of the cellar window, in which case it will be in reverse position, as shown in Fig. 2.

As shown in dotted line in Figs. 7 and 8, when the hose is entirely removed from the guiding mechanism and placed in the storage container, for instance, for winter storage, a plate 33 having wing flanges 34 and 35 may be placed so as to straddle the flanges 23 and 24 of the hose rollers, the plate 33 being fastened to the retainer plate 13 by bolts 36.

For effecting a substantial closure of all of the openings of the retainer plate 13, for instance, for winter storage of the hose, I provide a hinged plate 37 of the configuration shown in Fig. 8, supported from a hinge 38. A second and stationary plate 39 of the configuration shown also in Fig. 8 is provided so as to cover the bottom of the opening 16. These two plates are also effective when the hose is not in use to prevent the egress of flies, mosquitos, etc. to the basement. The hinged flap 37 is made interchangeable with the stationary plate 39 when the retainer plate 13 is reversed vertically for application to the opposite end of the window sash.

The storage of the length of hose by gravity by my apparatus is effected by the following mechanism: upon the floor 40 of the basement, is positioned, as shown in Fig. 3, a container 41 of sufficient size to easily accommodate 100 feet of hose. Such box or container, having drain hole 56, is disposed upon the basement floor immediately below the window to which my guiding or conveyor mechanism has been applied, the hose extending from the faucet 12 being guided over the conveyor or guide described hereinabove and then through a preferably round guide strap 42 which may conveniently be screwed to the window sill 11.

In the embodiment shown in Fig. 3, the sill cock or faucet 12 is disposed on the outside of the building wall, the usual structure to be found in buildings already erected. In such instance, one end of the hose is connected to the faucet and the nozzle of the hose is first passed over the conveyor mechanism, through the guiding strap 42, and then down into the storage container 41.

In the embodiment shown in Fig. 4. the sill cock is disposed inside the basement with a handle 44 extending therefrom to the outside of the building wall. This construction is particularly preferred in a new building structure. In this instance, the length of hose is coiled first in the storage chamber 45, which may be supported from the roof rafters of the basement, the end of the hose carrying the end of the nozzle being passed through the strap 42 and then over the rollers of the conveyor mechanism to the outside of the building. In this construction, the hinged flap 37 is of particular advantage in that it is effective, when in its closed position, to prevent the nozzle of the hose from falling from the roller into the storage container, the depending projection 46 of the hinged flap 37 constituting an abutment for the ferrule of the hose nozzle.

Figure 1 shows the roller or conveyor mechanism installed in the left hand pane of the cellar window, while Figure 2 shows the application of the conveyor mechanism to the right hand pane of the cellar window, with substantially the same construction being used in both cases, except that the retainer plate 13 in the latter instance, is reversed vertically. I have shown these two positions of the conveyor mechanism as it is preferable to position such mechanism as near to the faucet as possible, so as to present a neat appearance and leave as little of the hose exposed to the sun and the elements as possible.

Of course, while I have shown my novel structure as including a storage container such as 41 and 45, it is obvious that the hose, after being passed over the conveyor mechanism may be permitted to drop, and be disposed indiscriminately, upon the floor of the basement. I prefer, however, to use a storage container so as to prevent soiling of the hose and to cause a confinement of the coils and convolutions thereof within the limited space of the storage container, as it has been found that the hose will not coil consistently in the same direction, for instance, in that in which it has been coiled when new. I have found, rather, that the coil or convolutions of the hose, when guided by the hanger strap 42, into the storage container, will coil in the shape of the figure 8, as shown in Fig. 5 of the drawings.

It will be readily understood by those skilled in the art that for the installation of the roller or conveyor mechanism it is necessary merely to remove a pane of glass from the basement window, cut the same to size after the roller assembly has been screwed in place, and replace the glass with putty on three sides and the metal angled iron 30 on the fourth side.

While I have described my inventive structure hereinabove, in its application to the guiding and conveying to a storage position, of a garden hose, it is obvious that my specific type of roller and conveyor structure may be used in other applications, for instance, in connection with the air hose at an automobile service station by means of which hose, compressed air is supplied for tire inflation. In Fig. 10 of the drawings, I have shown such application of my novel apparatus. It is believed unnecessary to specifically describe and to illustrate in detail such application of my novel structure, as it involves merely the positioning of my novel guide and conveyor mechanism near the upper portion of a container within which the hose may be stored by gravity, permitting such portion thereof as is necessary to reach the tire to be inflated to be withdrawn from the container by means of my roller and conveyor structure.

In such embodiment of my inventive structure, as shown in Fig. 10, the storage container comprises a round iron tank 47 constituting the bottom portion of a standard such as is customarily used at an automobile service station, the standard having an upper portion 48 secured by a hinge 49 and by a hasp 50 to the lower portion of the standard. Near the upper extremity of the standard may conveniently be applied a retainer plate, generally indicated as 51, carrying the hose roller or guiding mechanism substantially similar to the mechanism illustrated in Figs. 5 to 9, inclusive.

The bottom end 52 of the air hose, in such embodiment, is connected to a pipe 53 leading to a tank or other source of supply of compressed air. The portion 54 of the air hose extending outside of the standard and which is adapted to be withdrawn from the standard by means of the guiding and conveyor mechanism 51, is provided, instead of a nozzle, as in a garden hose, with a metal pipe 55 which may be conveniently provided with a thumb valve and pressure gauge and with a tire valve inflating connection 56.

While I have described particular embodiments of my invention, it is obvious that various changes therein, particularly in the arrangement, configuration and disposition of the several parts thereof, may be made without departing from my invention.

I claim:

1. In an apparatus of the type described, the combination of a hose conveyor mechanism comprising a retainer plate having an elongated opening extending vertically thereof, a pair of flanges cut from the retainer plate and extending rearwardly thereof, a pair of ball-bearing rollers disposed co-axially and for rotation, when conveying a length of hose, independently of each other, within said opening and supported by said flanges, and a storage container disposed immediately below and rearwardly of the conveyor mechanism for receiving a length of hose passed over the conveyor mechanism and permitted to drop by gravity therefrom into said storage container.

2. In an apparatus of the type described, the combination of a hose conveyor mechanism comprising a retainer plate having a pair of flanges cut therefrom so as to extend rearwardly thereof, a pair of co-axially disposed ball-bearing rollers supported by said flanges and rotatable, when conveying a length of hose, independently of each other, said rollers each having a peripheral flange extending from their edges near said plate flanges, and a storage container disposed immediately below and rearwardly of the conveyor mechanism for receiving a length of hose passed over the conveyor mechanism and permitted to drop by gravity therefrom into said storage container.

3. In an apparatus of the type described, the combination of a hose conveyor mechanism comprising a retainer plate having an elongated opening extending vertically thereof, a pair of flanges cut from the retainer plate and extending rearwardly thereof, a pair of ball-bearing rollers co-axially disposed within said opening and supported by said flanges and rotatable, when conveying a length of hose, independently of each other, said rollers each having a peripheral flange extending from their edges near said plate flanges, and a storage container disposed immediately below and rearwardly of the conveyor mechanism for receiving a length of hose passed over the conveyor mechanism and permitted to drop by gravity therefrom into said storage container.

4. A hose conveyor mechanism comprising an elongated retainer plate adapted for securement in an opening of a building structure, said retainer plate having a slot extending vertically therein, a pair of flanges extending from the sides of the slot rearwardly of the plate, and a pair of co-axially disposed shafts mounted upon said flanges and carrying a pair of co-axial rollers mounted upon ball-bearings so as to revolve, when conveying a length of hose independently of each other.

5. A hose conveyor mechanism comprising an elongated retainer plate adapted for securement in an opening of a building structure, said retainer plate having a slot extending vertically therein, a pair of flanges extending from the sides of the slot rearwardly of the plate, a pair of co-axially disposed shafts mounted upon said flanges and carrying a pair of co-axial rollers mounted upon ball-bearings so to revolve, when conveying a length of hose independently of each other, and an auxiliary roller disposed within the slot above, and spaced from, said pair of rollers.

6. A hose conveyor mechanism comprising an elongated retainer plate adapted for securement in an opening of a building structure, said retainer plate having a slot extending vertically therein, a pair of flanges extending from the sides of the slot rearwardly of the plate, a pair of co-axial shafts mounted upon said flanges and carrying a pair of co-axial rollers mounted upon ball-bearings so as to revolve independently of each other, an auxiliary roller disposed within the slot above and spaced from said pair of rollers, a hinged flap extending from a point above the slot and adapted to constitute a partial closure for the aperture between the first mentioned rollers and the auxiliary roller, and a fixed plate secured to the retainer plate below said pair of rollers and adapted to constitute a closure for the part of the slot below said rollers.

7. The combination, with a hose conveyor mechanism as claimed in claim 4, of a storage container disposed below the conveyor mechanism for receiving a length of hose passed over the conveyor mechanism and permitted to drop by gravity therefrom into said container.

8. The combination, with a hose conveyor mechanism as claimed in claim 4, of a storage container disposed below the conveyor mechanism for receiving a length of hose passed over the conveyor mechanism and permitted to drop by gravity therefrom into said container, and means for guiding said hose from said conveyor mechanism into said container, 9. A hose conveyor mechanism as claimed in claim 4, including an angle iron plate extending along one of the side edges of the retainer plate.

10. A hose conveyor mechanism comprising an elongated retainer plate adapted for securement in an opening of a building structure, said retainer plate having a slot extending vertically therein, a pair of flanges extending from the sides of the slot rearwardly of the plate, a pair of co-axial shafts mounted upon said flanges and carrying a pair of co-axial rollers mounted upon ball-bearings so as to revolve independently of each other, an auxiliary roller disposed within the slot above and spaced from said pair of rollers, and a hinged flap extending from a point above the slot and adapted to constitute a partial closure for the aperture between the first mentioned rollers and the auxiliary roller.

GEORGE F. STEWART.